US011003555B2

(12) United States Patent
Gupta et al.

(10) Patent No.: US 11,003,555 B2
(45) Date of Patent: May 11, 2021

(54) TRACKING AND RECOVERING A DISK ALLOCATION STATE (71) Applicant: VMware, Inc., Palo Alto, CA (US)

(72) Inventors: Abhishek Gupta, Sunnyvale, CA (US); Jorge Guerra Delgado, Fremont, CA (US); Kapil Chowksey, Cupertino, CA (US); Sandeep Rangaswamy, Mountain View, CA (US); Srinath Premachandran, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 572 days.

(21) Appl. No.: 15/844,539

(22) Filed: Dec. 16, 2017

(65) Prior Publication Data
US 2019/0188098 A1   Jun. 20, 2019

(51) Int. Cl.
*G06F 11/20* (2006.01)
*G06F 3/06* (2006.01)

(52) U.S. Cl.
CPC .......... *G06F 11/2069* (2013.01); *G06F 3/067* (2013.01); *G06F 11/2082* (2013.01); *G06F 3/065* (2013.01); *G06F 2201/84* (2013.01)

(58) Field of Classification Search
CPC ...... G06F 11/2069; G06F 3/067; G06F 3/065; G06F 2201/84
See application file for complete search history.

(56) References Cited

U.S. PATENT DOCUMENTS

| | | | | |
|---|---|---|---|---|
| 5,481,694 A | * | 1/1996 | Chao | G06F 3/0601 711/112 |
| 5,983,361 A | * | 11/1999 | Lee | G06F 11/1471 714/19 |
| 7,519,628 B1 | * | 4/2009 | Leverett | G06F 16/10 |
| 2006/0089951 A1 | * | 4/2006 | Factor | G06F 11/1471 |
| 2014/0095437 A1 | * | 4/2014 | Hwang | G06F 11/1469 707/634 |
| 2016/0092113 A1 | * | 3/2016 | Veal | G06F 3/0608 711/103 |

* cited by examiner

*Primary Examiner* — Michelle T Bechtold (57) ABSTRACT

The subject matter described herein is generally directed towards tracking and recovering a disk allocation state. An on-disk log of operations is maintained to describe operations performed to an in-memory partial reference count map. Upon a crash of a host computing device during a checkpoint operation to an on-disk complete reference count map, the on-disk log of operations is used to undo and then redo the operations, or just redo the operations. In this manner, a disk allocation state prior to the crash is recreated in the on-disk complete reference count map with atomicity and crash consistency.

20 Claims, 7 Drawing Sheets

TRACKING AND RECOVERING A DISK ALLOCATION STATE

BACKGROUND

An allocation map tracks storage usage on a storage device (e.g., a storage disk). The allocation map is a data structure used to indicate whether units of storage in the storage device have been allocated or not allocated. For example, an allocation bitmap may be a free space bitmap defined by a bit array to indicate, by a "0" or "1", whether a particular unit of storage in the storage device is free for writing (not allocated) or not free for writing (allocated).

Various data storage systems have been developed to manage on-disk data structures in an attempt to maintain the allocation bitmap with atomicity and durability. These systems often require complex processes for these attempts, while also using a significant amount of memory. Additionally, existing systems have difficulty achieving crash consistency in the allocation map.

BRIEF DESCRIPTION OF THE DRAWINGS

The present description will be better understood from the following detailed description read in the light of the accompanying drawings, wherein.

DETAILED DESCRIPTION

The systems described herein provide an allocation map that uses delta updates to track changes to the allocation map (e.g. allocation bitmap) for a disk or other persistent medium. One master map on-disk holds the allocation status of all the blocks (the "on-disk master bitmap"). The map is paged-in (read only) during allocation operations, but is never written. As bits are set or unset (or reference values changed if the bitmap is actually a reference count map) during the allocation operations, an in-memory delta bitmap is updated. The present disclosure addresses storage and crash concerns with the allocation map.

Specifically, in contrast to existing systems that maintain a shadow copy of the changes to the allocation map, such as in a journal or delta file which has to be updated and written to disk, aspects of the disclosure reduce the amount of disk space needed by never writing or copying the allocation map to the disk. Rather, using various configurations described herein, atomicity and crash consistency in the allocation map are provided using a log of operations corresponding to the changes.

More particularly, the systems of the present disclosure maintain a log that describes the disk storage allocation representative of whether the disk space is allocated or not allocated, but without storing the allocation data itself. An on-disk log of operations includes a summary of the input/output (I/O) operations that have changed the in-memory delta bitmap (or an in-memory partial reference count map in the case of reference counts rather than bits). This configuration with a summary log in accordance with various aspects results in a more efficient system that uses less memory than a system using journaling or shadow copies (e.g., 9 bytes per entry instead of 4,096 bytes per entry). The summary log also provides a more reliable process for reversion of the on-disk log of operations to a pre-crash state, such as when a crash occurs during a checkpoint operation.

Some implementations (e.g., see FIG. 1) are directed to blocks having an allocation status of either 'allocated' or 'free'. In such implementations, the in-memory delta bitmap and on-disk master bitmap are used in conjunction with the log. Other implementations (e.g., see FIG. 4) define the allocation status as a reference count. In such implementations, the in-memory delta bitmap is referred to as an in-memory partial reference count map, and the on-disk master bitmap is referred to as an on-disk complete reference count map.

Figure 1:
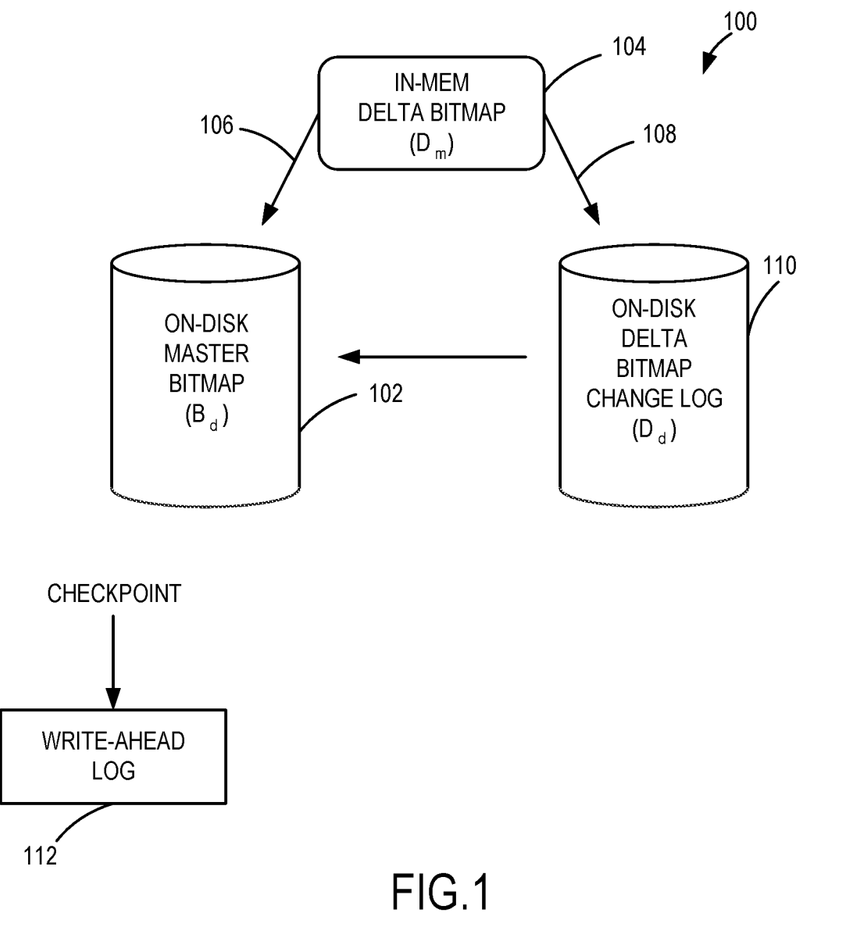
FIG. 1 illustrates a block diagram of a block allocation scheme.

FIG. 1 shows an exemplary block diagram illustrating a block allocation scheme 100 for operations performed during a checkpoint. In one example, the block allocation scheme 100 is configured for 16 kilobyte block allocations for 20 terabytes of space. Accordingly, the bitmaps in this example use 160 megabytes of on-disk space. However, it should be appreciated that different schemes having different block allocations may be used.

In the illustrated example, the bitmap is represented by the on-disk master bitmap ($B_d$) 102. However, as also described herein, the present disclosure may be used with different types of allocation maps, including reference count allocation maps. In one example, the bitmap is paged-in (read only) from $B_d$ during block allocations or frees (i.e. when blocks are allocated or unallocated), but never written back to $B_d$. In operation, as bits are set or unset during allocation and frees, an in-memory delta bitmap ($D_m$) 104 is updated at operation 106. It should be appreciated that the state of bits in $D_m$ 104 always overrides the state of bits in the $B_d$ 102. In one example, the format of $D_m$ 104 is a sequence of records containing:

1. Bit number; and
2. State (ALLOC/FREE).

The property of $D_m$ 104 is defined as follows: if the changes reflected in $D_m$ 104 are partially applied to the $B_d$ 102, and a crash occurs, then during recovery, the delta bitmap change log ($D_d$ 110) is played as a undo log of operations to revert $B_d$ 102 to a pre-crash state. This can be performed without knowledge of the current value in $B_d$ 102.

More specifically, during a checkpoint operation, the block allocation scheme 100 performs the following:

(1) At operation 108, write $D_m$ 104 to an on-disk delta bitmap change log ($D_d$ 110) as a log of operations, along with a checkpoint generation number (G).
(2) Apply $D_m$ 104 to $B_d$ 102 using $D_d$ 110.
(3) Clear in-memory $D_m$ 104.
(4) Inform a write-ahead log (WAL) 112 to checkpoint the log with G.

Figure 2:
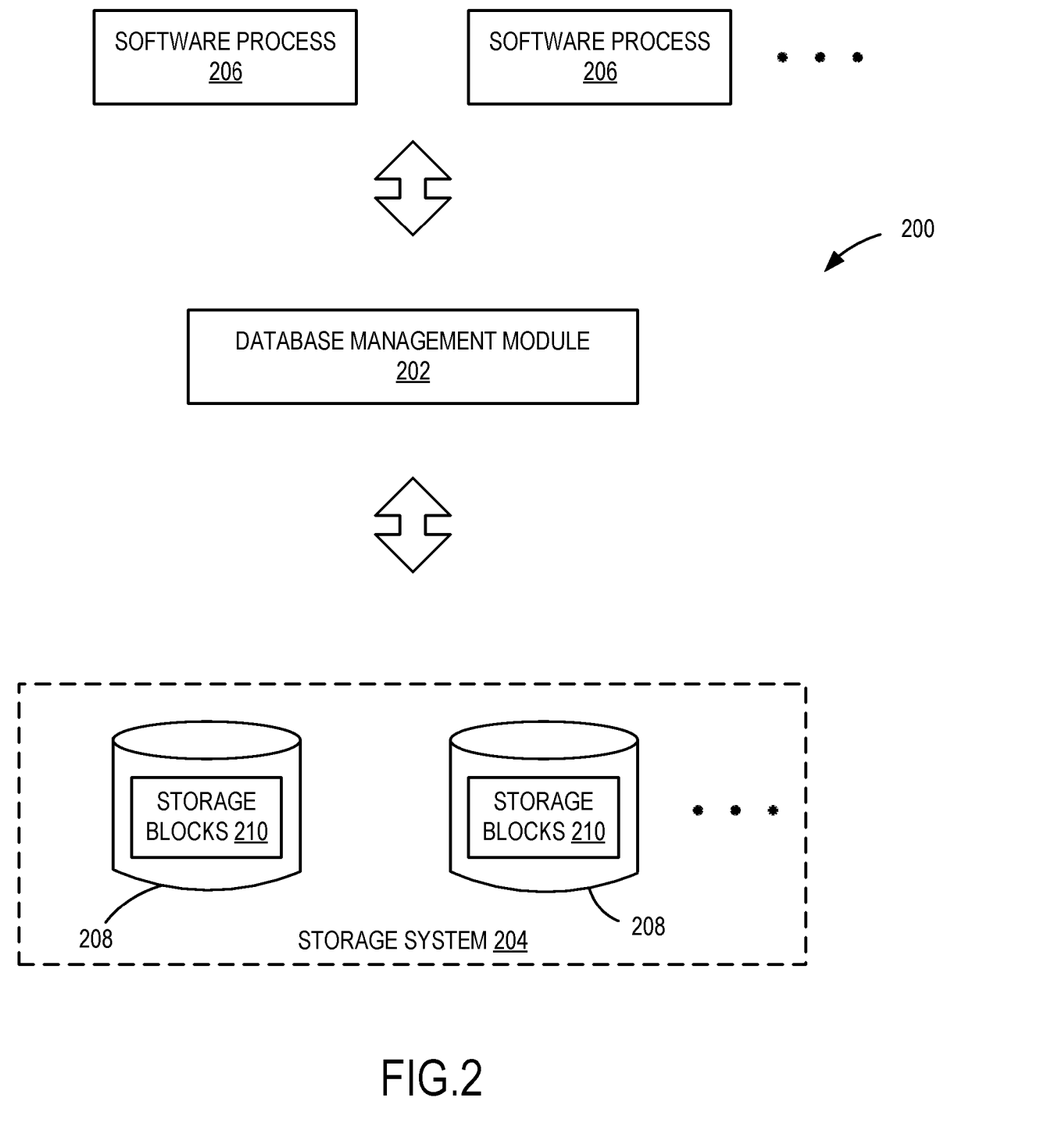
FIG. 2 is a block diagram of a data storage system according to an example embodiment.

If a crash occurs in the above described example, a recovery operation is performed in one example to re-perform each of the operations from the on-disk log of operations (as illustrated in FIG. 2) to recreate a disk allocation state prior to the crash (e.g., a pre-crash disk allocation state in the on-disk master bitmap). For example, and with continued reference to the checkpoint operations described above, if a crash occurs during (1), then $D_d$ 110 does not have a required value of G, resulting in $D_d$ 110 being discarded by the recovery process. If a crash occurs after (1), but during (2), then the recovery process plays each record of $D_d$ 110 as an undo log on $B_d$ 102 and restores the latter to a consistent state (i.e., a pre-crash disk allocation state) as if $D_d$ 110 was never applied to $B_d$ 102. For example, if Bit X in $B_d$ 102=ALLOC and Bit X in $D_d$ 110=ALLOC, then bit X in $B_d$ 102 is undone. If Bit Y in $B_d$ 102=FREE and Bit Y in $D_d$ 110=ALLOC, then bit Y in $B_d$ 102 is retained. In both of these examples, Bits X and Y may be set without knowledge of the current values for Bits X and Y in $B_d$ 102; that is, knowing that $D_d$ 110=ALLOC for Bits X and Y, both of Bits X and Y are set to FREE when playing $D_d$ 110 as an undo log. Thereafter, the checkpoint operation is performed as if not having been performed at all before the crash occurred.

In an alternative embodiment, rather than undoing any changes that were possibly made to $B_d$ 102 prior to the crash and then re-attempting to apply the changes, the log of operations in $D_d$ 110 is played as a redo log. That is, each and every (e.g., all) of the operations in $D_d$ 110 are applied to $B_d$ 102 to make $B_d$ 102 consistent with $D_m$ 104, whether or not those operations were applied pre-crash. Using the above example, if Bit X in $B_d$ 102=ALLOC and Bit X in $D_d$ 110=ALLOC, then bit X in $B_d$ 102 is retained (or re-set to ALLOC). If Bit Y in $B_d$ 102=FREE and Bit Y in $D_d$ 110=ALLOC, then bit Y in $B_d$ 102 is set to ALLOC. In both of these examples, Bits X and Y may be set without knowledge of the current values for Bits X and Y in $B_d$ 102; that is, knowing that $D_d$ 110=ALLOC for Bits X and Y, both of Bits X and Y are set to ALLOC when playing $D_d$ 110 as a redo log.

In various aspects, tracking and recovering of a disk allocation state is performed with the block allocation scheme 100 using an on-disk log of operations representing a summary of the I/O operations applied to the in-memory partial reference count map. It should be noted that all updates from executing functions are performed on the in-memory delta bitmap. Thus, at various times, a checkpoint occurs for the bitmaps and the in-memory delta bitmap is flushed to the disk as $D_d$ 110. Thereafter, as part of the checkpoint operation, $D_d$ 110 is applied to $B_d$ 102. Various examples allow for recovering of the disk allocation state if a crash occurs during the performance of the checkpoint operations. In some examples, the updating is performed only when a checkpoint operation occurs.

In one example, the checkpoint occurs in a data storage system 200 as illustrated in FIG. 2. The data storage system 200 includes a database management module 202 and a storage system 204. The data storage system 200 allows software processes 206 to perform data storage operations, such as writing, reading or deleting data stored in the storage system 204. The data stored in the data storage system 200 can be any type of data. As described in detail below, the data storage system 200 is configured to execute these storage operations with atomicity and crash consistency using reduced storage space.

The software processes 206 are any software programs, applications or software routines that can run on one or more computer systems, which can be physical computers, virtual computers or processes such as VMware® virtual machines (VMs) or other virtual computing instances, or a distributed computer system. In some examples, the software processes 206 initiate various data storage operations, such as read, write, delete and rename operations, for data stored in the storage system 204. The system and functionality described herein is applicable to systems that are virtualized and not virtualized.

The storage system 204 of the data storage system 200 includes one or more computer data storage devices 208, which are used by the data storage system 200 to store data. The data storage devices 208 can be any type of non-volatile storage devices that are commonly used for data storage. In some examples, the data storage devices 208 include, but are not limited to, one or more of solid-state devices (SSDs), hard disks, local disks, disk arrays, or virtual storage area networks, among others. In the illustrated example, the storage space provided by the data storage devices 208 is divided into storage blocks 210, which can be disk blocks, disk sectors storage device sectors, or other units of storage.

In one example, the storage system 204 is a local storage system of a computer system supporting the database management module 202, such as a hard drive disk. In another example, the storage system 204 is a remote storage system that can be accessed via a network, such as a network-attached storage (NAS). In still another example, the storage system 204 is a distributed storage system such as a storage area network (SAN) or a virtual SAN. Depending on the environment, the storage system 204 may include other components commonly found in these types of storage systems, such as network adapters, storage drivers and/or storage management servers. The storage system 204 is scalable, and thus, the number of data storage devices 208 included in the storage system 204 can be changed as needed to increase or decrease the capacity of the storage system 204 to support increase/decrease in workload. Consequently, the exact number of data storage devices 208 included in the storage system 204 can vary from one to hundreds or more. Thus, as should be appreciated, with some existing systems, the amount of space needed to store a shadow copy or journal of the in-memory reference count map can increase and quickly become a significant storage overhead. In contrast, with the present disclosure, the amount of storage space used is significantly reduced by using an on-disk log of operations that includes (e.g., only) a summary of the operations performed, but not a copy of the changed data.

The database management module 202 operates to manage data stored in the storage system 204. Data stored in the storage system 204 can include any type of computer files stored in the storage system 204, including information that describes the stored data with respect to its characteristics and physical storage locations. For example, metadata of stored data or "storage metadata" includes file names, file paths, modification dates and permissions. In a distributed file system architecture, the storage metadata may be stored in multiple servers located at different storage locations.

In one example, the database management module 202 is implemented as software running on one or more computer systems, which can be physical computers, virtual computers, or a distributed computer system. However, in other examples, the database management module 202 can be implemented in any combination of hardware and software.

If the database management module 202 is used for a file system, the database management module 202 presents data stored in the storage system 204 as one or more file system structures, which include hierarchies of file system objects, such as file system volumes, file directories/folders, and files, for shared use of the storage system. Thus, the database management module 202 in some examples organizes the storage resources of the storage system 204 into the file system structures so that the software processes 206 can access the file system objects for various file system operations, such as creating file system objects, deleting file system objects, writing or storing file system objects, reading or retrieving file system objects and renaming file system objects.

Figure 3:
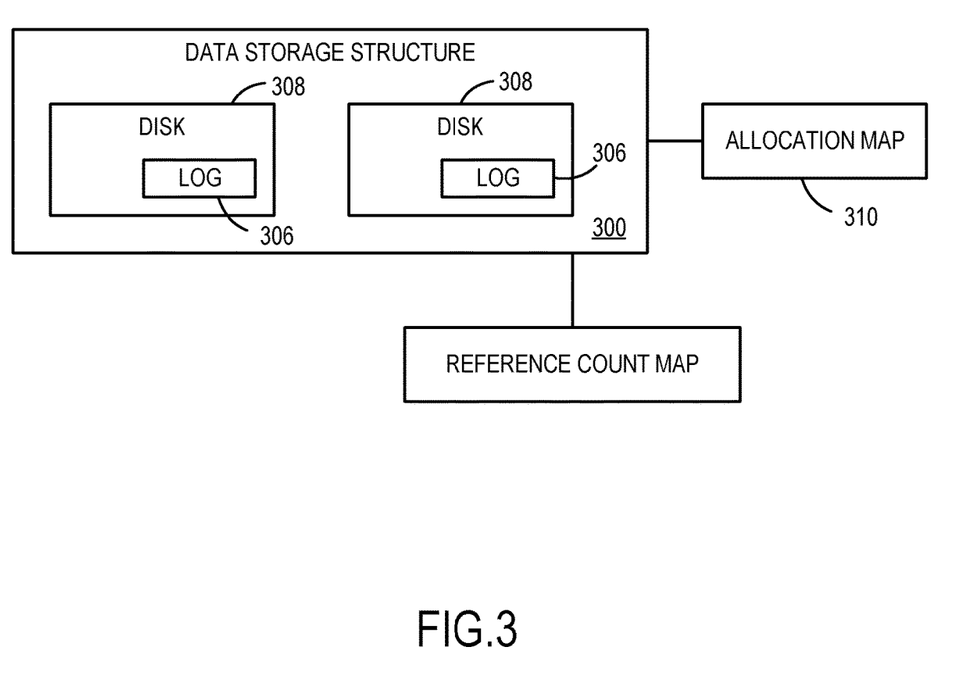
FIG. 3 is a block diagram of a data storage structure used by the data storage system according to an example embodiment.

The database management module 202 uses data stored on-disk, including the on-disk log of operations for storage allocation and maintenance, such as during a system crash. As illustrated in FIG. 3 (and with continued reference to FIG. 2), to support operations on a data storage structure 300, the data storage system 200 uses a reference count map 304 in combination with an on-disk log 306 located on each of a plurality of disks 308 (two disks 308 are illustrated in FIG. 3 as an example). As described herein, the database management module 202 manages the storage data structure 302 using the reference count map 304 and the on-disk log 306 to provide atomicity and crash consistency with respect to processing data storage operations on the storage data structure 300 (e.g., to achieve atomicity and crash consistency in an allocation map 310).

The on-disk log 306 is a data structure that is used by the database management module 202 to maintain a log of operations instead of storing a copy of the result of the operations performed. The on-disk log 306 is used to recover a disk allocation state when a crash occurs during checkpointing. Checkpointing is a process where data modifications corresponding to transaction requests that were received after the previous checkpoint are executed on the storage system 204, e.g., written to one or more storage disks in the storage system 204 (illustrated as the disks 308 in FIG. 3).

The on-disk log 306, which in one example is an on-disk log of operations representing a summary of the I/O operations applied to an in-memory partial reference count map, is used by the database management module 202 to restore the system to a particular state of the storage data structure 300 when a particular checkpointing process is completed. Using summary descriptions in the on-disk log 306, the data storage structure 300 at a desired state can also be identified for recovery after a failure, such as a system crash that occurs during a checkpoint operation.

In one example, the checkpoint operation includes applying the on-disk log 306 to the on-disk complete reference count map. Upon a crash, such as a crash of a host computing device during application of the changes in the on-disk log 306 to the on-disk complete reference count map, various aspects allow for an undo or revert of each of the operations from the on-disk log 306, without knowledge of the state of the on-disk complete reference count map prior to the crash, to recreate a disk allocation state prior to the crash. Thereafter, a system restart can be performed.

Alternatively, various aspects allow for a redo of each of the operations from the on-disk log 306, without knowledge of the state of the on-disk complete reference count map prior to the crash, to create a disk allocation state that reflects the changes from the in-memory partial reference count map.

As should be appreciated the allocation map 310 is a data structure used to indicate whether units of storage spaces in the storage system 204 have been allocated or not allocated. A unit of storage space can be any predefined size of storage that can be used to store data, such as data for the data storage structure 300. As an example, a unit of storage space can be a storage block of 4096 bytes or 16,000 bytes. A storage space unit is allocated if that storage space unit has been assigned to be written with data, which in some examples is represented by a "1" bit when the allocation map 310 is an allocation bitmap. A storage space unit is not allocated if that storage space unit is available or free to be assigned or allocated, which in some examples is represented by a "0" bit when the allocation map 310 is an allocation bitmap. In other embodiments, a reference count (ref count byte value) is used to determine the allocation state of a storage block instead of a bit value.

Figure 4:
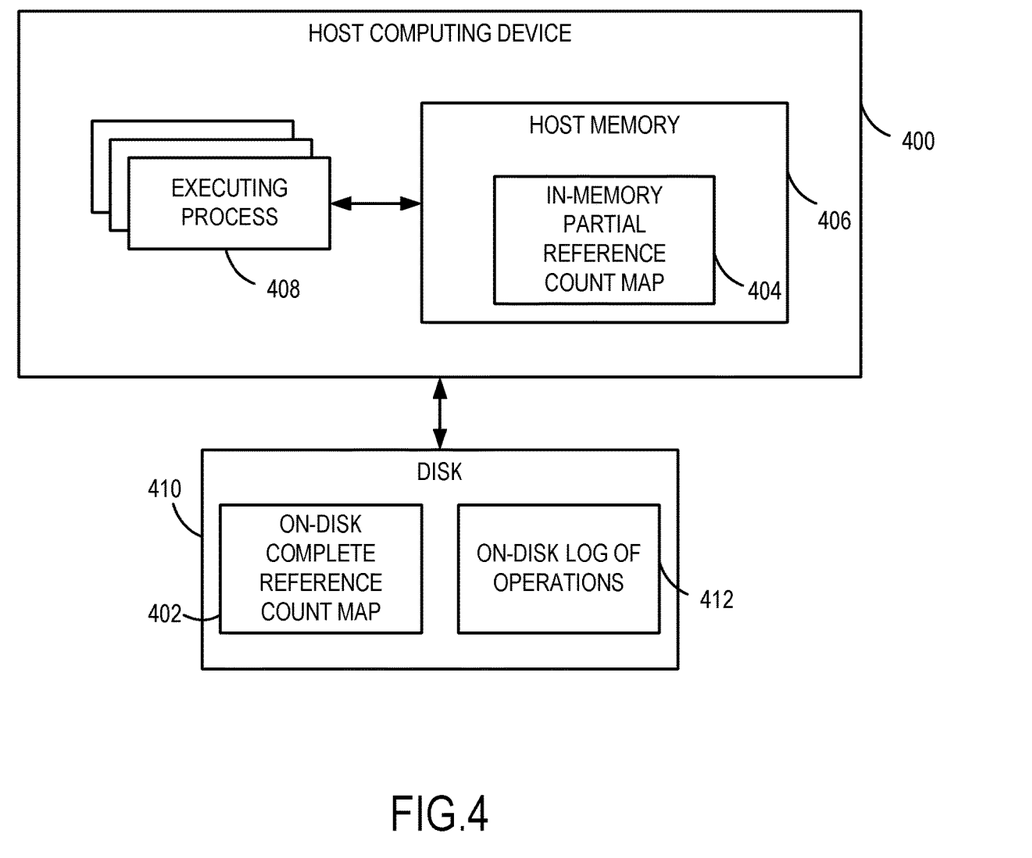
FIG. 4 is a block diagram of a host computing system and disk according to an example embodiment.

The allocation map 310 is persistently stored in the storage system 204, e.g., on one or more storage disks. As illustrated in FIG. 4, the allocation map 310 is referred to as an on-disk complete reference count map 402. When the host boots up, for example, when a host computing device 400 boot up, the host computing device 400 loads some, or all, of an on-disk complete reference count map 402 from a disk 410. In some examples, this loading occurs when a process starts executing (illustrated as an executing process 408), such as the software process 206 (shown in FIG. 2). This operation is referred to as "the map is paged-in" and results in an in-memory partial reference count map 404 being stored in a host memory 406 of the host computing device 400. A reference count map in one example is a map that identifies which blocks on the disk 410 are allocated and how many references there are to that block (the ref count), and which blocks are free. The in-memory partial reference count map 404 in one example is a sequence of records of the following format: (offset (or bit number), state (e.g., ref count, where 0 is free, and anything more than 0 means allocated). Thus, as should be appreciated, in this example, instead of a binary bitmap (having only "0" and "1" designations), a reference count map uses "0" and positive integers to identify the number of references to that block.

As the process 408 executes, functions are executed, which require performance of disk operations (e.g., allocate, free, increase ref count, decrease ref count). These operations are performed to the in-memory partial reference count map 404. In some examples, the only two operations are "allocate" and "free" (no increase or decrease of the ref count). In these examples, as described above, the ref counts are bits, and the bit is set (change to 1) or unset (change to 0). The bits indicate whether a process is referencing the block on disk represented by the particular bit. In other examples, when there is more than one process referencing the block on the disk, numbers greater than "1" are used.

At some point, the device (e.g., the operating system of the host computing device 400 or the process itself) performs a checkpoint operation. The checkpoint operation flushes the in-memory partial reference count map 404 to the disk 410 as an on-disk log of operations 412. The on-disk log of operations 412 in one example is a summary of the I/O operations applied to the in-memory partial reference count map 404. Thus, the on-disk log of operations 412 is not a copy of the actual data resulting from the operations applied to the in-memory partial reference count map 404, but instead is a summary of the operations that have been applied to the in-memory partial reference count map 404. For example, the summary in the on-disk log of operations 412 may provide a description indicating an allocate or deallocate, or increase/decrease to/from a particular ref count, for a specific storage block. The use of the on-disk log of operations 412 instead of, for example, journaling or storing a shadow copy of all operations performed, results in a more efficient disk allocation process that uses less memory, among other advantages.

Continuing with this example, part of the checkpoint operation is to apply the changes (in the on-disk log of operations 412) to the on-disk complete reference count map 402. If a crash of the host computing device 400 occurs during any phase of the checkpoint operation, a reversion and re-application process (or just a re-application process) is performed. In particular, if the crash occurs when writing from the in-memory partial reference count map 404 to the on-disk log of operations 412, the on-disk log of operations 412 is discarded, and the writing operation is retried after recovering from the crash.

If the write from the in-memory partial reference count map 404 to the on-disk log of operations 412 completes, and the crash occurs when applying the on-disk log of operations 412 to the on-disk complete reference count map 402, the recovery process walks through the on-disk log of operations 412 and either undoes (i.e., reverts by playing each record as an undo operation) or redoes (i.e., applies or re-applies by playing each record as a redo operation) each of the changes. The walk-through process in this example is not a "rollback" in the sense of knowing the pre-crash state, but, as a result of not knowing which changes were made prior to the crash, the disclosure either undoes each change or redoes each change from the on-disk log of operations 412, even if certain changes do not have to be made (e.g., operations that were already performed before the crash).

It should be noted that the process or undoing or redoing each of the changes, in one example, occurs after the host computing device 400 recovers from the crash and detects a mismatch in the checkpoint generation number. The checkpoint generation number is saved to the persistent medium with the on-disk log of operations during a checkpoint operation, and is one example way to determine, post-crash, whether the checkpoint operation completed successfully.

Figure 5:
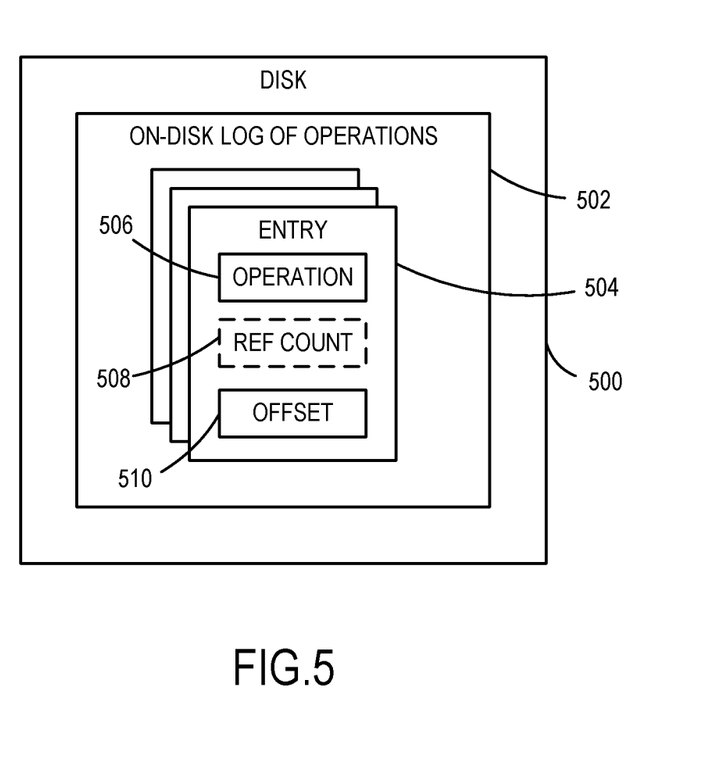
FIG. 5 is a block diagram of a disk having an on-disk log of operations according to an example embodiment.

In various examples, the host computing device 400 executes the logic above using the on-disk log of operations 412 to restore the on-disk complete reference count map 402 after a system crash that occurs during performance of the checkpoint operation. In one example, as illustrated in FIG. 5, showing a disk 500 having an on-disk log of operations 502, a plurality of entries 504 are provided (e.g. recorded) within the on-disk log of operation 502. The entries 504 are not copies of the results of the actual applied operations (e.g., the operations applied to the in-memory partial reference count map 404), but instead represent a summary of those applied operations themselves.

Figure 6:
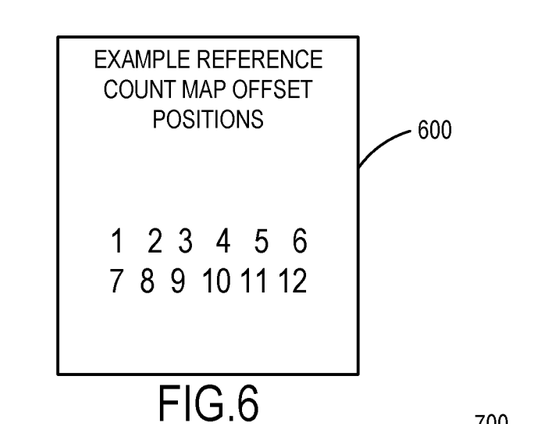
FIG. 6 is a block diagram of reference count map offset positions according to an example embodiment.

In one example, each entry 504 includes an operation summary 506, an offset 510, and optionally a ref count 508 (when the allocation map is not a bitmap). The operation summary 506 is a description of the operation that is applied, for example, the I/O operation, such as "allocate", "deallocate", "increase" to/from or "decrease" to/from. The offset 510 is a value identifying a position in the reference count map, for example, a position in the in-memory partial reference count map 404. The ref count 508 indicates a number of references to the particular storage block (e.g., a number of processes pointing to or accessing that storage block). In general, the ref count 508 is a value indicating the number of references to that storage block. FIG. 6 illustrates example reference count map offset positions 600, which show twelve possible positions. However, it should be appreciated that additional or fewer positions may be provided.

Figure 7:
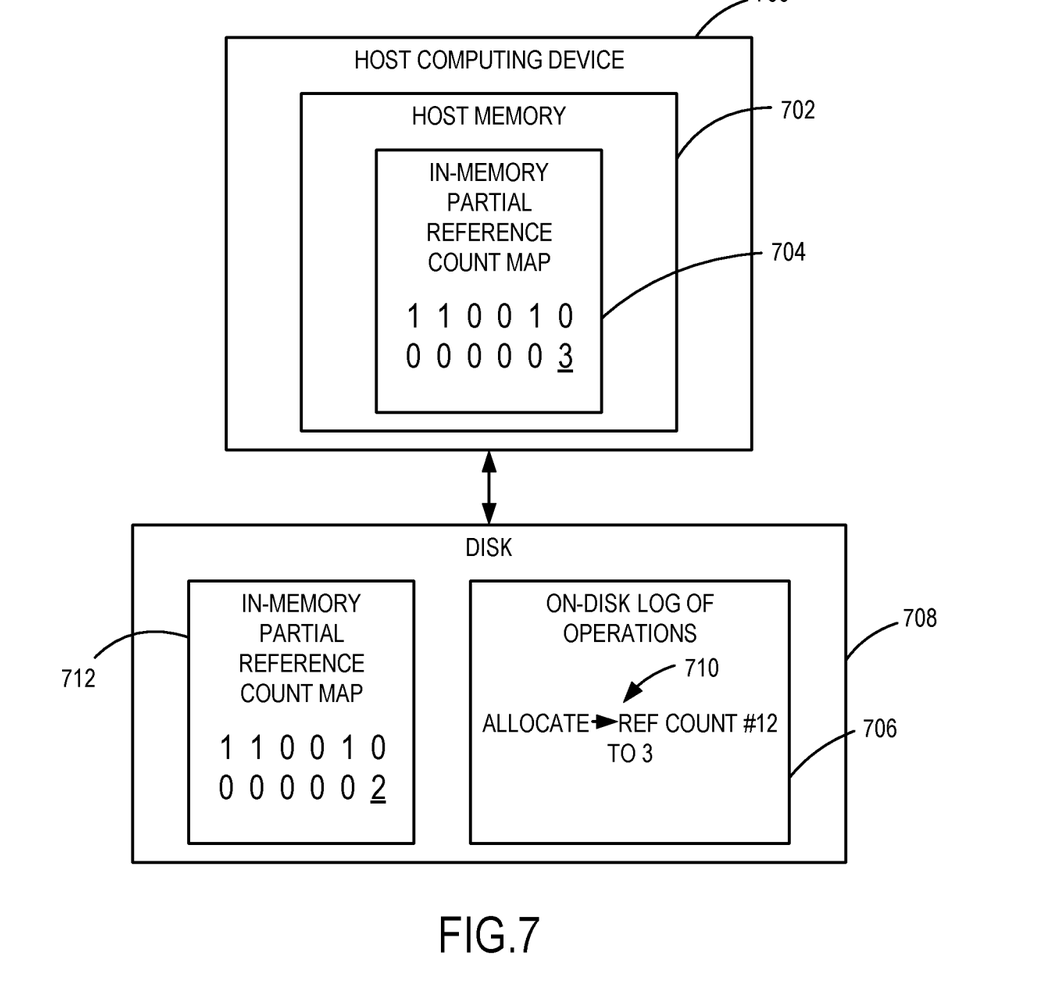
FIG. 7 is a block diagram of a host computing system and disk illustrating operations performed according to an example embodiment.

In operation, and with reference to FIG. 7, in one example, a host computing device 700 stores within a host memory 702 an in-memory partial reference count map 704. In this example, the in-memory partial reference count map 704 has twelve positions, which can be identified as position #1 to position #12 as shown in FIG. 6. In the illustrated example, an on-disk log of operations 706 on a disk 708 includes a summary of the operation applied, which has a description of the operation applied (e.g., the operation 506 in FIG. 5), the new ref count (e.g., the changed ref count 508 in FIG. 5) and the position in the in-memory partial reference count map 704 (e.g., the offset 510 in FIG. 5). That is, the on-disk log of operations 706 includes entries that describe the operation instead of being a copy of the result of the actual operation performed, such that the on-disk log of operations 706 can be used as a representation of the I/O operations applied to the in-memory partial reference count map 704.

Thus, during a crash that occurs during a checkpoint operation, the host computing device 700 performs an undo or revert of each of the operations from the on-disk log of operations 706 to recreate a block allocation state on the disk 708 prior to the crash. In this example, the on-disk log of operations 706 indicates that the operation applied (or to be applied) to the on-disk complete reference count map 712 is to allocate the ref count at position #12 to a "3" to reflect the change made previously to the in-memory partial reference count map 704, which is shown as "ALLOCATE→REF COUNT #12 TO 3". The allocated value of the ref count in the on-disk complete reference count map 712 is then undone, the result of which is illustrated as a "2" in the on-disk complete reference count map 702. After undoing all the operations by playing back the on-disk log of operations 706 as an undo log, without regard for the values stored in the on-disk complete reference count map 712, the system will again try to apply the changes from the on-disk log of operations 706 to the on-disk complete reference count map 712 (which would result in the on-disk complete reference count map 702 storing a "3" in position #12.

Alternatively, rather than undoing and redoing the changes from the on-disk log of operations, the disclosure may just redo each of the changes from the on-disk log of operations. In the example above, rather than changing the "3" to a "2" (undo), then back to "3" (redo), the disclosure just sets a "3" in position #12. This is done without regard for the values stored in the on-disk complete reference count map 712.

In still another alternative example, rather than identifying a target ref count for a particular offset, the on-disk log of operations 706 may identify a prior ref count for a particular offset. In the above example, the record thus appears as "ALLOCATE→REF COUNT #12 FROM 2". Upon applying this record, the ref count in the on-disk complete reference count map 712 is set to "3".

The tracking and recovering of a disk allocation state in accordance with the various examples in the present disclosure may be performed in different systems. For example, the processes described herein may be performed in a virtualized computing setting or a non-virtualized computing setting. Tracking and recovering of a disk allocation state can be implemented in a system with virtual computing instances (VCIs) in which a crash occurs during performance of a checkpoint operation for a guest operating system (OS). In this example, the VCIs, such as VMs, containers, or other processes or applications, run on host devices (i.e., hosts) in a datacenter cluster coordinated by a datacenter virtualization infrastructure (DVI). In a VMware, Inc. platform example, the DVI is vSphere® that provides a platform for datacenter virtualization by managing ESXi® hypervisors on ESX® hosts. However, the processes contemplated by the present disclosure may be implemented on a non-virtualized computing platform.

Figure 8:
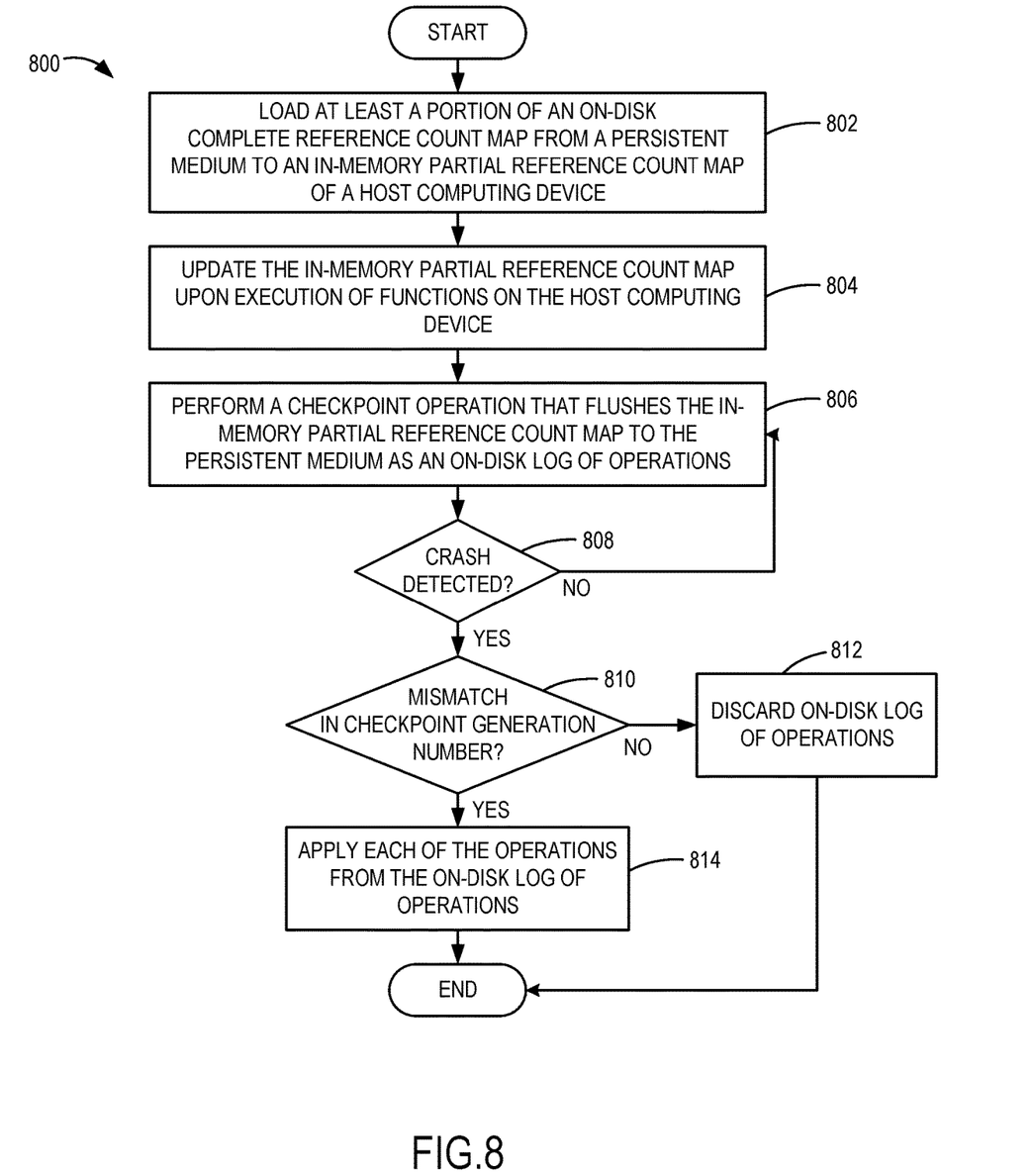
FIG. 8 is a flowchart illustrating a process for tracking and recovering a disk allocation state according to an example embodiment.

FIG. 8 is a flowchart illustrating operations performed by a process for tracking and recovering a disk allocation state. The example operations illustrated in FIG. 8 can be performed in a different order than illustrated, and each of the operations can be performed simultaneously, concurrently or sequentially with any of the other operations. Operations may be added or removed, which are contemplated by this disclosure.

The method 800 includes loading at least a portion of an on-disk complete reference count map from a persistent medium to an in-memory partial reference count map of a host computing device at 802. In one example, "in-memory" refers to the memory of the host computing device. However, in other examples, the loading may be performed with respect to a virtualized memory. The method 800 may be applied to any process, whether virtualized or non-virtualized. Additionally, "on-disk" refers to any persistent medium, for example, a local disk, a disk array, a virtual storage area network, etc.

In this example, the loading of at least a portion of an on-disk complete reference count map from a persistent medium to an in-memory partial reference count map of a host computing device at 802 includes loading an in-memory partial reference count map that identifies data blocks that are allocated on the persistent medium.

The method 800 also includes updating the in-memory partial reference count map upon execution of functions on the host computing device at 804. In one example, the execution of the functions results in performance of I/O operations on the persistent medium that change the in-memory partial reference count map. The operations in some examples include operations related to the allocation of storage blocks.

The method 800 further includes performing a checkpoint operation that flushes the in-memory partial reference count map to the persistent medium as an on-disk log of operations at 806. In one example, the on-disk log of operations represents a summary of the I/O operations applied to the in-memory partial reference count map. As described herein, the summary includes an operation entry, an offset entry and optionally a ref count entry. These entries describe the I/O operation instead of being a copy of the data resulting from actual operations that are applied or performed.

With continued reference to performing the checkpoint operation, this operation in one example includes applying the on-disk log of operations to the on-disk complete reference count map. For example, the allocate/deallocate or increase/decrease ref count operations are applied.

A determination is made at 808 whether a crash occurred. In one example, a determination is made as to whether a crash of the host computing device occurred during applying the changes in the on-disk log of operations to the on-disk complete reference count map. If no crash occurred, the checkpoint operation, including applying the on-disk log of operations to the on-disk complete reference count map continues to be performed at 806.

If a crash occurred as determined at 808, a determination is made at 810 whether a mismatch in a checkpoint generation number occurred at 810. If no mismatch is detected, then the on-disk log of operations is discarded at 812 and a retry or the applying is performed after recovering from the crash. If a mismatch is detected at 810, then after the host computing device recovers, each of the operations from the on-disk log of operations may be undone to recreate a disk allocation state prior to the crash. As described herein, the undoing includes walking through the on-disk log of operations and undoing each of those changes (e.g., playing each record as an undo log) based in the summary information in the on-disk log of operations. Thereafter, an attempt to apply the on-disk log of operations is performed.

Alternatively, as described above, each of the operations from the on-disk log of operations may be applied at 814 or redone, without first undoing the changes. In either of these examples, the disclosure operates without knowledge of the disk allocation state reflected in the on-disk complete reference count map.

The herein disclosed examples, including the method 800 may be performed in different settings and for different uses. For example, the operations described herein can be used when generating file system snapshots. In this example, the on-disk log operations is updated to reflect an increase or decrease to the ref count for the "pages of memory being used".

As another example, the operations described herein can be used when cloning a tree, for example, cloning the root of the tree (e.g., a nested tree). In one example, the root node and all descendent nodes have a ref count of two. As an element of the root is changed or modified, the ref count on that node is decreased, which is then represented in the on-disk log operations as a summary operation entry. The cloning of the tree may be used in a $B^+$-tree data structure, wherein space (e.g., disk blocks) can be allocated from the storage volume only as needed to grow the tree.

Exemplary Operating Environment

It should be understood that any of the examples described herein are non-limiting. As such, the present disclosure is not limited to any particular embodiments, aspects, concepts, structures, functionalities or examples described herein. Rather, the present disclosure may be used in various ways that provide benefits and advantages in non-virtualized and virtualized computing environments in general.

While some virtualized embodiments are described with reference to VMs for clarity of description, the disclosure is operable with other forms of VCIs. A VCI may be a VM, a container, and/or any other type of virtualized computing instance.

In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'server', 'computing device' and the like are used herein to refer to any device with processing capability such as a physical processor for executing computer program code or other instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for tracking and receiving a disk allocation state, including when a crash occurs during a checkpoint operation.

The term "comprising" is used in this specification to mean including the feature(s) or act(s) followed thereafter, without excluding the presence of one or more additional features or acts.

What is claimed is:

1. A system for tracking and recovering a disk allocation state, the system comprising:
    at least one physical processor; and
    at least one memory comprising computer program code, the at least one memory and the computer program code configured to, with the at least one physical processor, cause the physical processor to at least:
    load at least a portion of an on-disk complete reference count map from a persistent medium to an in-memory partial reference count map of a host computing device, the in-memory partial reference count map identifying data blocks that are allocated on the persistent medium;
    update the in-memory partial reference count map upon execution of functions on the host computing device, the execution of the functions resulting in performance of input/output (I/O) operations on the persistent medium that change the in-memory partial reference count map;
    perform a checkpoint operation that flushes the in-memory partial reference count map to the persistent medium to create a summary of an on-disk log of operations, the summary of the on-disk log of operations representing a description of the I/O operations applied to the in-memory partial reference count map, wherein the description of the I/O operations does not include a copy of actual operations applied to the in-memory partial reference count map or a copy of changed data corresponding to the in-memory partial reference count map having the actual operations applied thereto, and the checkpoint operation further comprising applying the on-disk log of operations to the on-disk complete reference count map; and
    upon a crash of the host computing device during applying the changes in the on-disk log of operations to the on-disk complete reference count map:
        after the host computing device recovers, apply each of the operations from the on-disk log of operations to the on-disk complete reference count map such that the on-disk complete reference count map reflects the updated in-memory partial reference count map.

2. The system of claim 1, wherein the computer program code is configured to restart the applying of the on-disk log of operations to the on-disk complete reference count map after the host computing device recovers from the crash, wherein the operations from the on-disk log of operations are applied without regard to a pre-crash state of the on-disk complete reference count map.

3. The system of claim 1, wherein the computer program code is configured to discard the on-disk log of operations when, upon the crash, a mismatch in a checkpoint generation number is not detected.

4. The system of claim 1, wherein the computer program code is further configured to, prior to applying each of the operations from the on-disk log of operations, undo each of the operations from the on-disk log of operations to recreate a pre-crash disk allocation state in the on-disk complete reference count map.

5. The system of claim 1, wherein the description of the I/O operations comprises, for each of the I/O operations, at least a natural language description of the operation and an offset value identifying a position in the in-memory partial reference count map where the operation is applied.

6. The system of claim 5, wherein the natural language description of the I/O operations further comprises at least a reference count number identifying a number of references to the data blocks by a plurality of processes, and the natural language description indicates one of an allocate or deallocate, or increase/decrease to/from a particular reference count, for one of the data blocks.

7. The system of claim 1, wherein the description of the I/O operations does not include a shadow copy or journal of the in-memory partial reference count map.

8. A method for tracking and recovering a disk allocation state, the method comprising:
    loading at least a portion of an on-disk complete reference count map from a persistent medium to an in-memory partial reference count map of a host computing device, the in-memory partial reference count map identifying data blocks that are allocated on the persistent medium;

updating the in-memory partial reference count map upon execution of functions on the host computing device, the execution of the functions resulting in performance of input/output (I/O) operations on the persistent medium that change the in-memory partial reference count map;

performing a checkpoint operation that flushes the in-memory partial reference count map to the persistent medium to create a summary of an on-disk log of operations, the summary of the on-disk log of operations representing a description of the I/O operations applied to the in-memory partial reference count map, wherein the description of the I/O operations does not include a copy of actual operations applied to the in-memory partial reference count map or a copy of changed data corresponding to the in-memory partial reference count map having the actual operations applied thereto, and the checkpoint operation further comprising applying the on-disk log of operations to the on-disk complete reference count map; and upon a crash of the host computing device during applying the changes in the on-disk log of operations to the on-disk complete reference count map:
  after the host computing device recovers, applying each of the operations from the on-disk log of operations to the on-disk complete reference count map such that the on-disk complete reference count map reflects the updated in-memory partial reference count map.

9. The method of claim 8, further comprising restarting the applying of the on-disk log of operations to the on-disk complete reference count map after the host computing device recovers from the crash, wherein the operations from the on-disk log of operations are applied without regard to a pre-crash state of the on-disk complete reference count map.

10. The method of claim 8, further comprising discarding the on-disk log of operations when, upon the crash, a mismatch in a checkpoint generation number is not detected.

11. The method of claim 8, further comprising, prior to applying each of the operations from the on-disk log of operations, undoing each of the operations from the on-disk log of operations to recreate a pre-crash disk allocation state in the on-disk complete reference count map.

12. The method of claim 8, wherein natural language entries that describe the I/O operations comprise, for each of the I/O operations, at least a description of the operation and an offset value identifying a position in the in-memory partial reference count map where the operation is applied.

13. The method of claim 12, wherein the natural language entries that describe the I/O operations further comprises at least a reference count number identifying a number of references to the data blocks by a plurality of processes.

14. The method of claim 8, wherein the summary of the on-disk log of operations does not include a shadow copy or journal of the in-memory reference count map.

15. One or more non-transitory computer storage media having computer-executable instructions that, upon execution by a processor, cause the processor to at least perform operations comprising:
  loading at least a portion of an on-disk complete reference count map from a persistent medium to an in-memory partial reference count map of a host computing device, the in-memory partial reference count map identifying data blocks that are allocated on the persistent medium;

updating the in-memory partial reference count map upon execution of functions on the host computing device, the execution of the functions resulting in performance of input/output (I/O) operations on the persistent medium that change the in-memory partial reference count map;

performing a checkpoint operation that flushes the in-memory partial reference count map to the persistent medium to create a summary of an on-disk log of operations, the summary of the on-disk log of operations representing a description of the I/O operations applied to the in-memory partial reference count map, wherein the description of the I/O operations does not include a copy of actual operations applied to the in-memory partial reference count map or a copy of changed data corresponding to the in-memory partial reference count map having the actual operations applied thereto, and the checkpoint operation further comprises applying the on-disk log of operations to the on-disk complete reference count map; and upon a crash of the host computing device during applying the changes in the on-disk log of operations to the on-disk complete reference count map:
  after the host computing device recovers, applying each of the operations from the on-disk log of operations to the on-disk complete reference count map such that the on-disk complete reference count map reflects the updated in-memory partial reference count map.

16. The one or more non-transitory computer storage media of claim 15, wherein the computer-executable instructions further cause the processor to restart the applying of the on-disk log of operations to the on-disk complete reference count map after the host computing device recovers from the crash, wherein the operations from the on-disk log of operations are applied without regard to a pre-crash state of the on-disk complete reference count map.

17. The one or more non-transitory computer storage media of claim 15, wherein the computer-executable instructions further cause the processor to discard the on-disk log of operations when, upon the crash, a mismatch in a checkpoint generation number is not detected.

18. The one or more non-transitory computer storage media of claim 15, wherein the computer-executable instructions further cause the processor to, prior to applying each of the operations from the on-disk log of operations, undo each of the operations from the on-disk log of operations to recreate a pre-crash disk allocation state in the on-disk complete reference count map.

19. The one or more non-transitory computer storage media of claim 15, wherein the description of the I/O operations comprises, for each of the I/O operations, at least a natural language description of the operation and an offset value identifying a position in the in-memory partial reference count map where the operation is applied.

20. The one or more non-transitory computer storage media of claim 19, wherein the description of the I/O operations further comprises at least a reference count number identifying a number of references to the data blocks by a plurality of processes.

* * * * *